US010178253B2

(12) United States Patent
Murodate (10) Patent No.: US 10,178,253 B2
(45) Date of Patent: Jan. 8, 2019

(54) IMAGE READING APPARATUS (71) Applicant: Brother Kogyo Kabushiki Kaisha, Nagoya-shi, Aichi-ken (JP)

(72) Inventor: Yusuke Murodate, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/714,343

(22) Filed: Sep. 25, 2017

(65) Prior Publication Data

US 2018/0091670 A1    Mar. 29, 2018

(30) Foreign Application Priority Data

Sep. 29, 2016  (JP) ................................ 2016-191180

(51) Int. Cl.
*H04N 1/04*    (2006.01)
*H04N 1/00*    (2006.01)
*H04N 1/12*    (2006.01)

(52) U.S. Cl.
CPC ..... *H04N 1/00549* (2013.01); *H04N 1/00554* (2013.01); *H04N 1/1235* (2013.01); *H04N 2201/0081* (2013.01)

(58) Field of Classification Search
None
See application file for complete search history.

(56) References Cited

U.S. PATENT DOCUMENTS

| 8,208,180 | B2 * | 6/2012 | Osakabe | ............ H04N 1/00519 358/400 |
| 8,246,035 | B2 | 8/2012 | Ito | |
| 2007/0201109 | A1 * | 8/2007 | Osakabe | ............ H04N 1/00519 358/474 |
| 2007/0251056 | A1 * | 11/2007 | Aoyagi | .................. G03G 15/60 16/221 |
| 2010/0014127 | A1 * | 1/2010 | Osakabe | ............ H04N 1/00519 358/497 |
| 2010/0040398 | A1 * | 2/2010 | Shin | ..................... G03G 15/605 399/367 |
| 2010/0102500 | A1 | 4/2010 | Ito | |

FOREIGN PATENT DOCUMENTS

| JP | 2009232481 A | 10/2009 |
| JP | 4656226 B2 | 3/2011 |
| JP | 5050987 B2 | 10/2012 |

* cited by examiner

*Primary Examiner* — Cheukfan Lee
(74) *Attorney, Agent, or Firm* — Banner & Witcoff, Ltd.

(57) ABSTRACT

An image reading apparatus includes a reading unit, a cover, and a hinge mechanism connecting the cover to the reading unit pivotably about a pivot axis which extends in a first direction. A center of gravity of the cover is closer to a first end of the cover in a first direction than to a second end of the cover. A first hinge is spaced from the center of gravity toward the second end of the cover in the first direction. A second hinge is disposed closer to the center of gravity in the first direction than the first hinge. The first hinge includes a base member disposed movably in the reading unit, a pivot member coupled to the cover, and an urging member exerting an urging force between the base member and the pivot member so as to maintain the cover at a pivoted position.

8 Claims, 7 Drawing Sheets

Fig.7 COMPARATIVE EXAMPLE

Fig.8 COMPARATIVE EXAMPLE

IMAGE READING APPARATUS

CROSS-REFERENCE TO RELATED APPLICATION

This application claims priority from Japanese Patent Application No. 2016-191180 filed on Sep. 29, 2016, the content of which is incorporated herein by reference in its entirety.

FIELD OF DISCLOSURE

The disclosure relates to an image reading apparatus.

BACKGROUND

A known image reading apparatus includes a reading unit, a cover, and a hinge mechanism.

The reading unit includes a support surface and an image sensor configured to read an image of a document supported on the support surface while moving along the support surface.

The cover is disposed above the reading unit and includes a conveying unit configured to convey a document toward the image sensor. The image sensor stopped at a reading position reads an image of the document being conveyed.

The hinge mechanism connects the cover to the reading unit pivotably about a pivot axis relative to the support surface of the reading unit.

SUMMARY

It may be beneficial to provide an image reading apparatus in which a hinge mechanism offers improved operability in opening and closing a cover relative to a reading unit while rattling of the cover is prevented or reduced.

According to one or more aspects of the disclosure, an image reading apparatus comprises a reading unit, a cover, and a hinge mechanism. The reading unit includes a support surface configured to support a document thereon, and a reading sensor configured to read an image of the document supported on the support surface. The cover includes a conveying unit disposed above the reading unit and configured to convey a document to the reading sensor. The cover is pivotable about a pivot axis between a closed position and an open position relative to the support surface. The pivot axis extends in a first direction. The cover includes a first end and a second end in the first direction, the second end being opposite to the first end in the first direction. The hinge mechanism connects the cover to the reading unit pivotably about the pivot axis. The hinge mechanism includes a first hinge which includes a base member and a pivot member. The base member is movably disposed in the reading unit. The base member is movable in a second direction orthogonal to the support surface. The pivot member is supported by the base member pivotably about the pivot axis and coupled to the cover. The conveying unit and a center of gravity of the cover are both closer to the first end of the cover in the first direction than to the second end of the cover. The first hinge is spaced from the center of gravity toward the second end of the cover in the first direction, and the hinge mechanism further includes a second hinge disposed closer to the center of gravity in the first direction than the first hinge. The first hinge further includes an urging member configured to exert an urging force between the base member and the pivot member so as to maintain the cover at a pivoted positon between the closed position and the open position.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Hereinafter, an illustrative embodiment of the disclosure will be described with reference to the accompanying drawings.

Illustrative Embodiment

Figure 1:
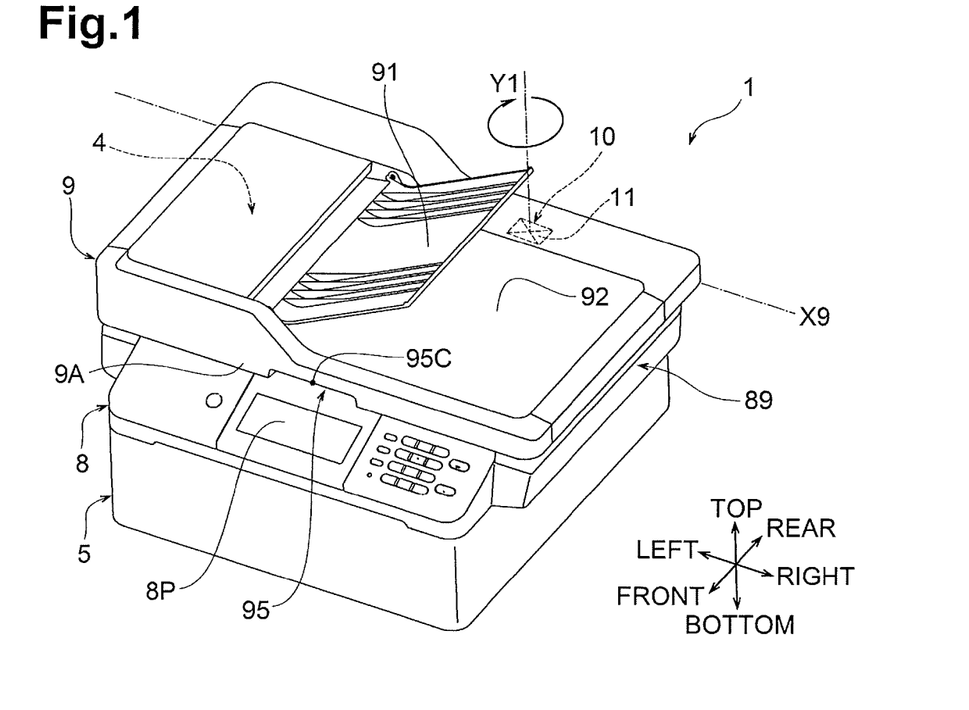
FIG. 1 is a perspective view of an image reading apparatus in an illustrative embodiment according to one or more aspects of the disclosure.

FIG. 1 shows an image reading apparatus 1 according to an illustrative embodiment according to one or more aspects of the disclosure. As shown in FIG. 1, a top-bottom direction may be defined with reference to an orientation of the image reading apparatus 1 that may be disposed in an orientation in which it may be intended to be used. A side of the image reading apparatus 1, in which an operation panel 8P may be provided, may be defined as the front of the image reading apparatus 1. A front-rear direction may be defined with reference to the front of the image reading apparatus 1. A right-left direction may be defined with respect to the image reading apparatus 1 as viewed from its front. The directions defined in FIG. 1 may be applicable to all the drawings. Hereinafter, various parts of the image reading apparatus 1 will be described with reference to appropriate drawings.

Overall Configuration

Figure 2:
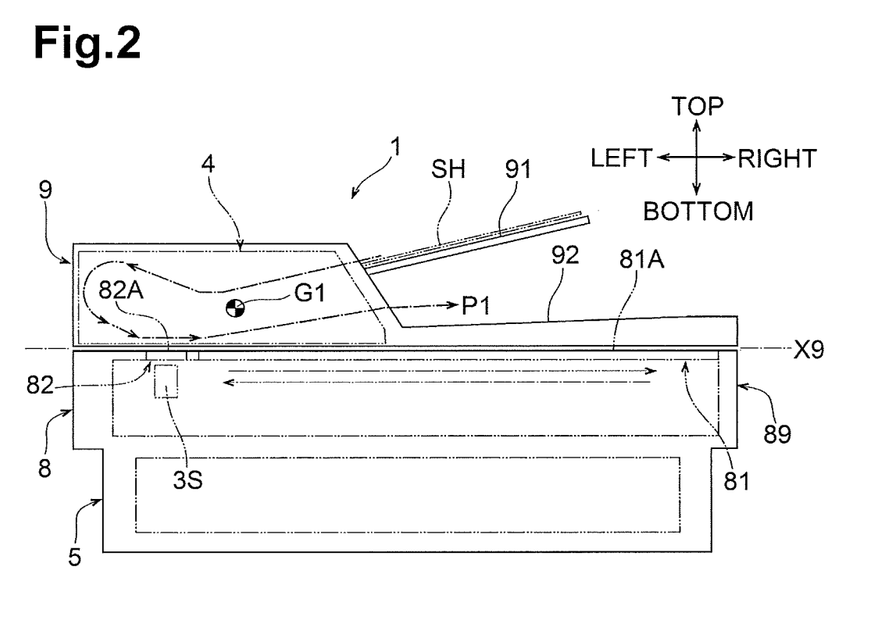
FIG. 2 is a schematic front view of the image reading apparatus in the illustrative embodiment.
Figure 3:
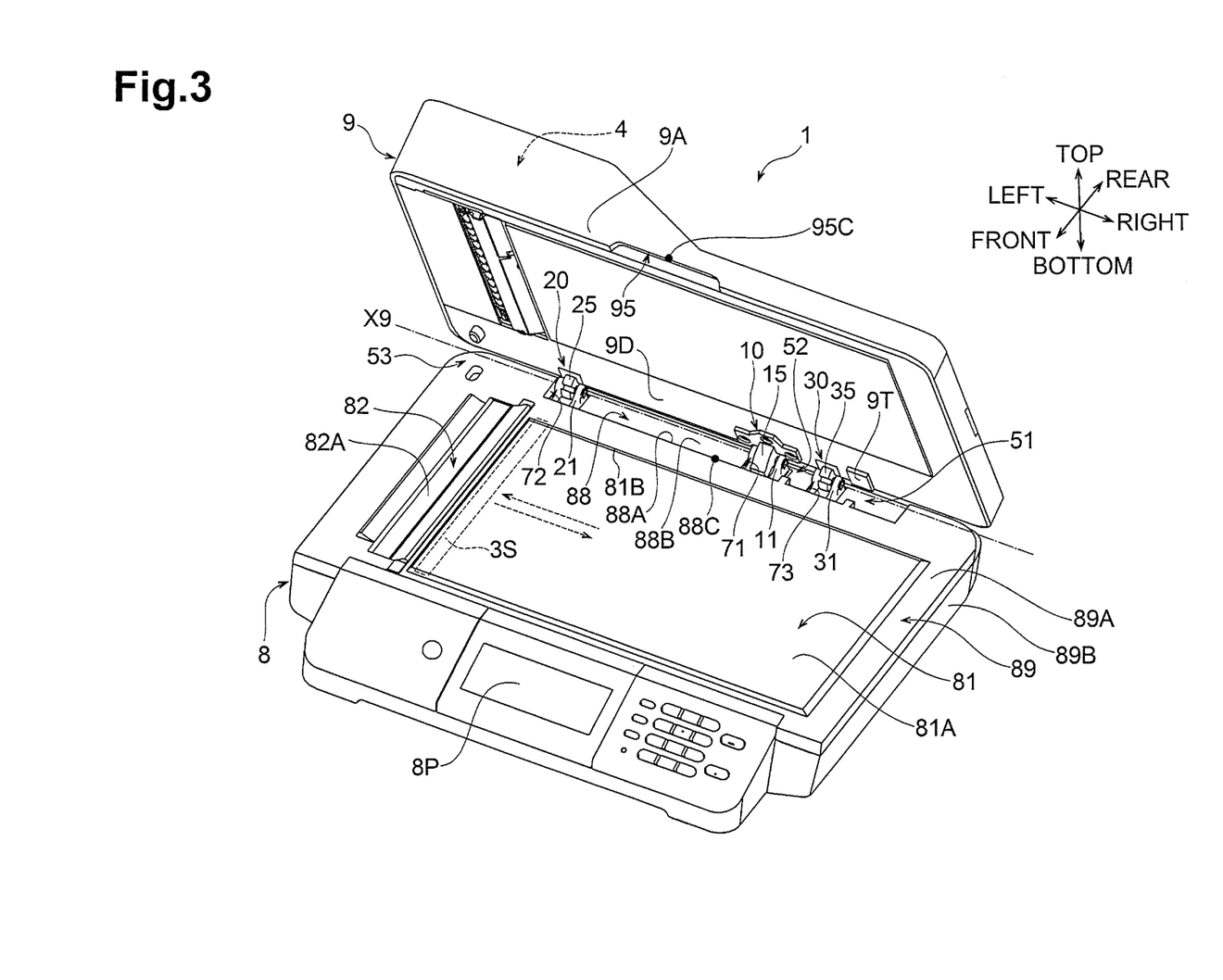
FIG. 3 is a perspective view of a cover of the image reading apparatus in the illustrative embodiment when the cover is at an open position.

As shown in FIGS. 1 to 3, the image reading apparatus 1 includes a reading unit 8, an image forming unit 5, and a cover 9. As shown in FIGS. 3 to 6, the image reading apparatus 1 further includes a hinge mechanism including a first hinge 10, a second hinge 20, and a third hinge 30.

As shown in FIGS. 1 and 2, the image forming unit 5 is disposed below the reading unit 8 so as to vertically overlap the reading unit 8. The image forming unit 5 is configured to form an image on a sheet by an inkjet method or a laser method.

The cover 9 is disposed above the reading unit 8. The cover 9 includes a feed tray 91, a conveying unit 4, and a discharge tray 92.

The feed tray 91 is disposed in a right portion of the cover 9. As shown in FIG. 2, the feed tray 91 supports, from below, one or more sheetlike documents (hereinafter referred to as sheets SH) to be read.

The conveying unit 4 is disposed closer to the left end of the cover 9 than to the right end of the cover 9. The conveying unit 4 has a known configuration including a drive motor, a conveying roller, a separation roller, and a discharge roller, which are omitted from the drawings. The conveying unit 4 is configured to convey the sheets SH supported on the feed tray 91, one by one, along a conveying path P1 and discharge the sheets SH onto the discharge tray 92.

As shown in FIGS. 1 and 2, the discharge tray 92 is disposed below the feed tray 91 which is disposed in the right portion of the cover 9. As shown in FIG. 2, the discharge tray 92 receives the sheets SH, in a stacked manner, discharged by the conveying unit 4 from a most downstream portion of the conveying path P1.

Figure 5:
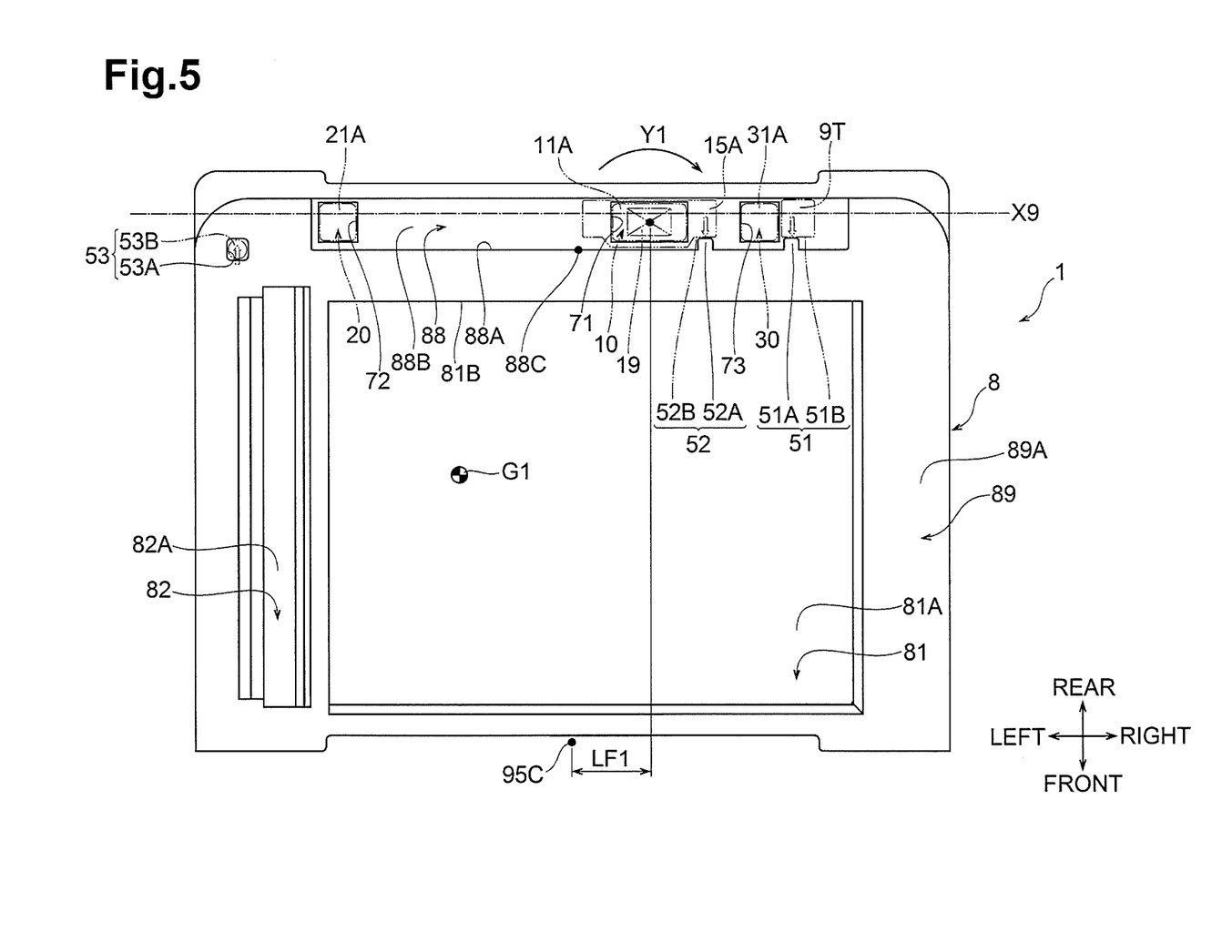
FIG. 5 is a plan view of a reading unit of the image reading apparatus in the illustrative embodiment, illustrating the relative positional relation among the reading unit, the cover, and first, second, and third hinges.

A center of gravity G1 of the cover 9 is located closer to the left end of the cover 9 than to the right end of the over 9 because the conveying unit 4, which is relatively heavy in weight, is disposed closer to the left end of the cover 9 than to the right end of the cover 9. FIG. 5 shows the center of gravity G1 of the cover 9 when the cover 9 is closed as shown in FIG. 1.

As shown in FIGS. 1 and 3, the cover 9 includes a handle 95 at its front end 9A. The handle 95 extends in the right-left direction and is recessed upward and rearward from a central portion of a lower edge of the front end 9A of the cover 9. A center 95C of the handle 95 in the right-left direction is set to substantially correspond to a center of the cover 9 in the right-left direction. The handle 95 allows a user to lift up the front end 9A of the cover 9. FIG. 5 shows the position of the center 95C of the handle 95 when the cover 9 is closed as shown in FIG. 1.

As shown in FIGS. 2 and 3, the reading unit 8 includes a scanner housing 89, a first platen glass 81, a second platen glass 82, and a reading sensor 3S.

The scanner housing 89 is flat and substantially box-shaped, and includes parts made by injection molding thermoplastic resin. The scanner housing 89 includes a base 89B and an upper cover 89A. The base 89B is open upward and includes a rectangular bottom wall and side walls standing from peripheral edges of the bottom wall. The upper cover 89A is disposed so as to cover an upper portion of the base 89B. The first platen glass 81 and the second platen glass 82 are disposed at the upper cover 89A. The second platen glass 82 is disposed to the left of the first platen glass 81 and elongate in the front-rear direction.

The first platen glass 81 has a substantially rectangular upper surface which serves as a support surface 81A. The support surface 81A supports, from below, a document when the image sensor 3S reads an image of the document placed stationarily on the support surface 81A. Documents to be read include a sheet of paper, an OHP sheet, and a book.

As shown in FIG. 3, a rear edge 81B of the support surface 81A extends in the right-left direction. The right-left direction is an example of a first direction. The support surface 81A extends horizontally. A direction orthogonal to the support surface 81A is the top-bottom direction. The top-bottom direction is an example of a second direction. The front-rear direction is an example of a third direction which is orthogonal to the first direction and the second direction.

The second platen glass 82 has a substantially rectangular upper surface which serves as a reading surface 82A. The reading surface 82A guides, from below, a sheet SH conveyed by the conveying unit 4 when the reading sensor 3S reads an image of the sheet SH.

The reading sensor 3S is held by a scanning mechanism (not shown) in the reading unit 8. The scanning mechanism reciprocates the reading sensor 3S in the right-left direction under the support surface 81A and the reading surface 82A. A known image reading sensor, such as a contact image sensor (CIS) and a charge coupled device (CCD), may be used as the reading sensor 3S.

When reading an image of a document supported on the support surface 81A, the image sensor 3S moves under the support surface 81A. When reading an image of a sheet SH conveyed by the conveying unit 4, the image sensor is stopped at a predetermined stationary reading position under the reading surface 82A.

In this illustrative embodiment, a document subjected to image reading while being supported on the support surface 81A and a sheet SH subjected to image reading while being conveyed by the conveying unit 4 may be substantially the same.

As shown in FIG. 1, the reading unit 8 includes, at its front face, an operation panel 8P, e.g., a touch panel. The operation panel 8P is operated by a user and receives various inputs for actuating the image forming unit 5, the reading sensor 3S, and the conveying unit 4.

<Configurations of First Hinge, Second Hinge, and Third Hinge>

As shown in FIGS. 3 to 6, the first hinge 10, the second hinge 20, and the third hinge 30 connect the cover 9 to the scanner housing 89 such that the cover 9 is pivotable about a pivot axis X9 which extends in the right-left direction.

Figure 4:
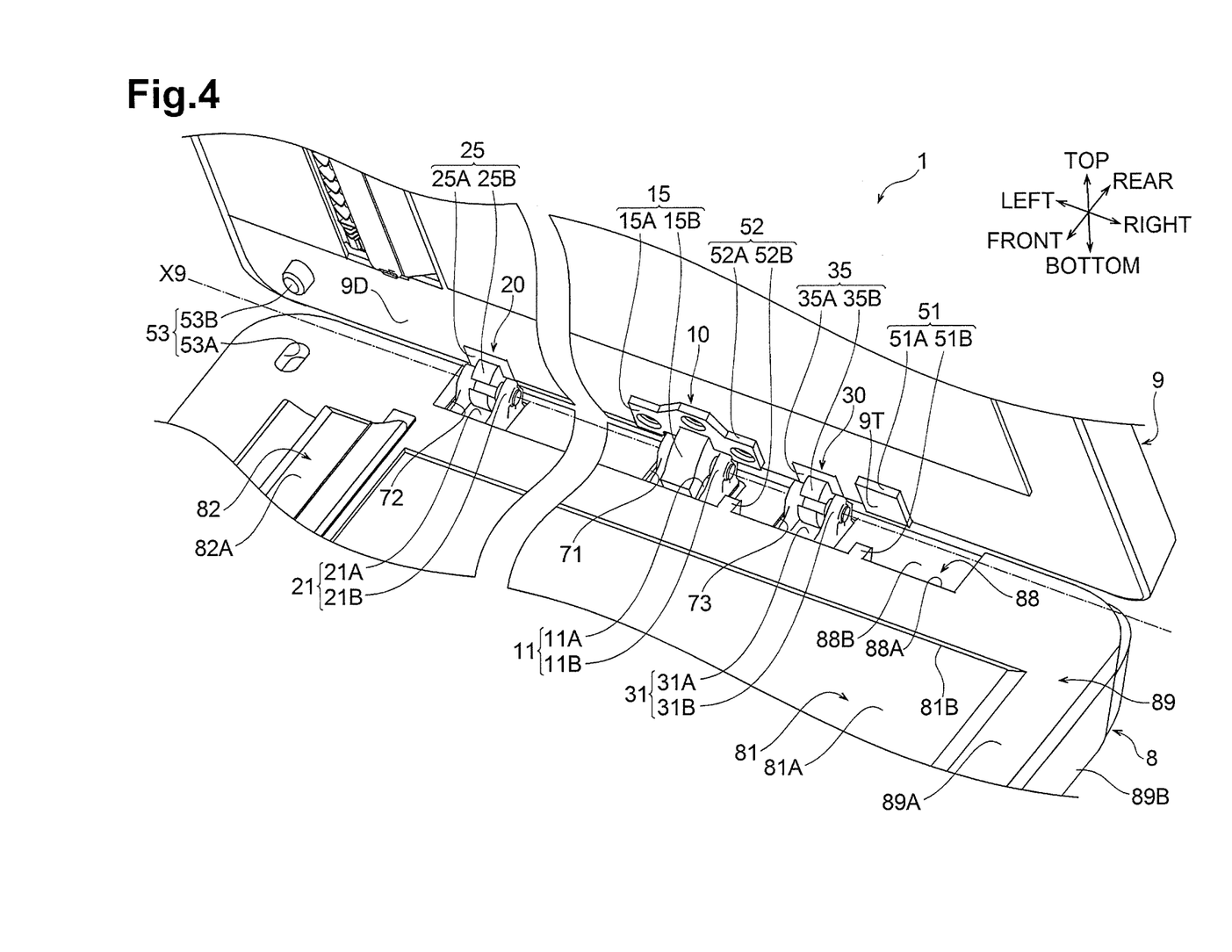
FIG. 4 is an enlarged perspective view of a main part of the image reading apparatus of FIG. 3.

More specifically, as shown in FIGS. 3 to 5, the scanner housing 89 includes a step 88 at its rear end. The step 88 is recessed, at a position behind the rear edge 81B of the support surface 81A, downward in a stepped manner from an upper surface of the upper cover 89A. The step 88 extends in the right-left direction.

Figure 6:
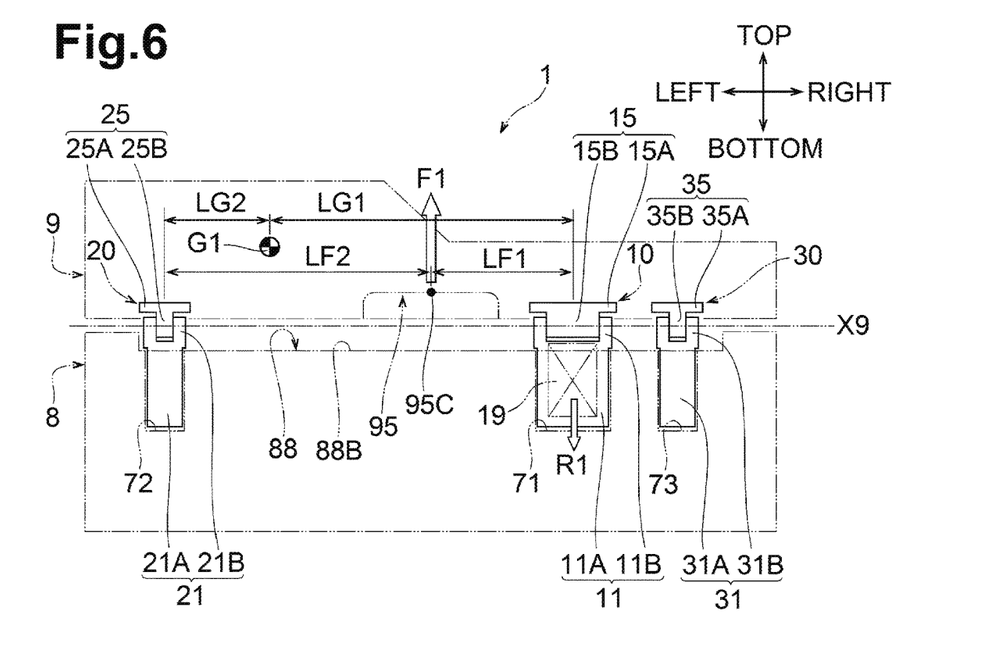
FIG. 6 is a schematic front view of the image reading apparatus in the illustrative embodiment, illustrating the relative positional relation among the reading unit, the cover, and the first, second, and third hinges.

As shown in FIGS. 5 and 6, the step 88 includes an accommodating portion 71 is formed at a position slightly offset to the right from a center 88C of the step 88 in the right-left direction. The step 88 also includes an accommodating portion 72 formed near the left end of the step 88, and an accommodating portion 73 formed near the right end of the step 88. Each of the accommodating portions 71, 72, 73 is a recess which is recessed from an upper surface of the step 88 and has a bottom. Each recess has a substantially rectangular vertical section. Each recess with a bottom penetrates through the upper cover 89A and reaches a rear portion of the base 89B.

The first hinge 10 includes a base member 11, a pivot member 15, and an urging member 19. The base member 11 includes, at its lower portion, a substantially prismatic column 11A. The column 11A is slidably accommodated in the accommodating portion 71. The column 11A is guided by inner wall surfaces of the accommodating portion 71 such that the base member 11 moves in the top-bottom direction relative to the scanner housing 89. The base member 11 includes, at its upper portion than the column 11A, a shaft support portion 11B which defines the pivot axis X9.

As shown in FIGS. 4 and 6, the pivot member 15 includes, at its lower portion, a shaft portion 15B. The shaft portion 15B is pivotably coupled to the shaft support portion 11B. Thus, the pivot member 15 is supported by the base member 11 pivotably about the pivot axis X9. The pivot member 15 includes, at is upper portion, a substantially plate-shaped coupler portion 15A. The coupler portion 15A is coupled to a portion of a bottom wall 9D of the cover 9, the portion of the bottom wall 9D being adjacent to the pivot axis X9. The cover 9 and the coupler portion 15A may be coupled to each other, for example, using screws or male and female engaging members.

As shown in FIGS. 5 and 6, the urging member 19 has a known configuration for exerting an urging force between the base member 11 and the pivot member 15 so as to maintain the cover 9 at a pivoted position (i.e., at any angle relative to the support surface 81A). Although omitted from the drawings, the urging member 19 may include a cam surface formed at the pivot member 15 to be adjacent to the shaft portion 15B, a compressed coil spring accommodated in the column 11A of the base member 11, and a slide-contact portion to be pressed against the cam surface of the pivot member 15.

The second hinge 20 includes a base member 21 and a pivot member 25. The base member 21 includes, at its lower portion, a substantially prismatic column 21A. The column 21A is slidably accommodated in the accommodating portion 72. The column 21A is guided by inner wall surfaces of the accommodating portion 72 such that the base member 21 moves in the top-bottom direction relative to the scanner housing 89. The base member 21 includes, at its upper portion than the column 21A, a shaft support portion 21B which defines the pivot axis X9.

The pivot member 25 includes, at its lower portion, a shaft portion 25B. The shaft portion 25B is pivotably coupled to the shaft support portion 21B. Thus, the pivot member 25 is supported by the base member 21 pivotably about the pivot axis X9. The pivot member 25 includes, at its upper portion, a coupler portion 25A. The coupler portion 25A is coupled to a portion of a bottom wall 9D of the cover 9, the portion of the bottom wall 9D being adjacent to the pivot axis X9. The cover 9 and the coupler portion 25A may be coupled to each other, for example, using screws or male and female engaging members.

The third hinge 30 includes a base member 31 and a pivot member 35. The base member 31 includes, at its lower portion, a substantially prismatic column 31A. The column 31A is slidably accommodated in the accommodating portion 73. The column 31A is guided by inner wall surfaces of the accommodating portion 73 such that the base member 31 moves in the top-bottom direction relative to the scanner housing 89. The base member 31 includes, at its upper portion than the column 31A, a shaft support portion 31B which defines the pivot axis X9.

The pivot member 35 includes, at its lower portion, a shaft portion 35B. The shaft portion 35B is pivotably coupled to the shaft support portion 31B. Thus, the pivot member 35 is supported by the base member 31 pivotably about the pivot axis X9. The pivot member 35 includes, at its upper portion, a coupler portion 35A. The coupler portion 35A is coupled to a portion of a bottom wall 9D of the cover 9, the portion of the bottom wall 9D being adjacent to the pivot axis X9.

The cover 9 and the coupler portion 35A may be coupled to each other, for example, using screws or male and female engaging members.

The first hinge 10, which includes the urging member 19, functions as a free stop hinge that maintains the cover 9 at any pivoted position. In contrast, the second hinge 20 and the third hinge 30 do not have a free stop function.

The first, second, and third hinges 10, 20, 30, the center of gravity G1 of the cover 9, and the center 95C of the handle 95 are positioned relative to one another, as described below.

As shown in FIG. 6, the first hinge 10 is disposed at a position spaced to the right from the center of gravity G1. The first hinge 10 is spaced by a distance LG1 from the center of gravity G1 in the right-left direction. The handle 95 is disposed between the first hinge 10 and the center of gravity G1 in the right-left direction. In particular, the first hinge 10 is positioned to the right of the handle 95, while the center of gravity G1 is located to the left of the handle 95. The first hinge 10 is spaced by a distance LF1 from the center 95C of the handle 95 in the right-left direction.

The second hinge 20 is disposed at a position spaced to the left from the center of gravity G1. The second hinge 20 is spaced by a distance LG2 from the center of gravity G1 in the right-left direction. The distance LG2 is set to be less than the distance LG1. In other words, the second hinge 20 is closer, in the right-left direction, to the center of gravity G1 than the first hinge 10.

The second hinge 20 and the center of gravity G1 are located on a same side of the handle center 95C in the right-left direction. The second hinge 20 is spaced by a distance LF2 from the center 95C of the handle 95 in the right-left direction. The distance LF2 is set to be greater than the distance LF1. In other words, the second hinge 20 is farther, in the right-left direction, from the center 95C of the handle 95 than the first hinge 10. In this illustrative embodiment, the center 95C of the handle 95 substantially corresponds to the center of the cover 9 in the right-left direction.

The third hinge 30 is disposed opposite to the center of gravity 95C relative to the first hinge 10 in the right-left direction. In other words, the first hinge 10 is disposed between the center of gravity G1 and the third hinge 30 in the right-left direction. The third hinge 30 is located right-most among the first, second, and third hinges 10, 20, 30. The third hinge 30 is relatively farther from the center of gravity G1 and the center 95C of the handle.

The first, second, and third hinges 10, 20, 30 thus configured allow the cover 9 to move between a closed position shown in FIGS. 1, 2, and 6, and an open position shown in FIGS. 3 and 4.

As shown in at least FIG. 1, the cover 9, when at the closed position, covers from above the support surface 81A. The cover 9 is configured to press a document supported on the support surface 81A against the support surface 81A. In this case, if the document is a book or the like and relatively thick, the base members 11, 21, 31 of the first, second, and third hinges 10, 20, 30 move up in the respective accommodating portions 71, 72, 73 of the scanner housing 9. Consequently, the cover 9 at the closed position is allowed to properly press the book or the like against the support surface 81A.

In contrast, in response to a user holding the hand 95 and opening the cover 9, the cover 9 is pivoted to the open position, shown in at least FIG. 3, about the pivot axis X9 such that the front end 9A moves upward and rearward. The cover 9, when at the open position, exposes the support surface 81A. In this state, the user is allowed to place a document to be read on the support surface 81A. The pivoted position of the cover 9 shown in at least FIG. 3 is merely an example. As long as the cover 9 is pivoted to at least partially expose the support surface 81A, the cover 9 is regarded as being located at the open position.

When the user opens the cover 9 from the closed position toward the open position by holding the handle 95 of the cover 9 and stops the cover 9 at a desired pivoted position, the urging member 19 of the first hinge 10 maintains the cover at the desired pivoted position.

First Stopper, Second Stopper, and Third Stopper

As shown in FIGS. 4 and 5, a first stopper 51, a second stopper 52, and a third stopper 53 are disposed between the reading unit 8 and the cover 9. As shown in FIGS. 1 and 5, in a case or the like where a user opens and closes the cover 9, the first, second, and third stoppers 51, 52, 53 are configured to stop the cover 9 located at the closed position from rotating along the support surface 81A, about the base member 11 in the direction of an arrow Y1. The cover 9 is caused to rotate because the center 95C of the handle 95, which is spaced frontward from the base member 11 of the first hinge 10, is located offset to the left from the base member 11 of the first hinge 10. The rotation direction shown by the arrow Y1 is clockwise when viewed from the top of the reading unit 8.

More specifically, as shown in FIGS. 4 and 5, the first stopper 51 is located opposite to the center of gravity G1 relative to the first hinge 10 in the right-left direction. In other words, the first hinge 10 is disposed between the first stopper 51 and the center of gravity G1 in the right-left direction. The first stopper 51 is located further to the right than the third hinge 30. The first stopper 51 includes a first protrusion 51A and a first contact surface 51B.

The first protrusion 51A is formed at the upper cover 89A of the scanner housing 89 of the reading unit 8. The first protrusion 51A is a relatively small piece shaped like a block and protruding rearward toward the pivot axis X9 from an upper end of a front wall 88A of the step 88.

The first contact surface 51B is formed at a first protrusion 9T which is adjacent to the pivot axis X9 of the bottom wall 9D of the cover 9 and protrudes downward. The first contact surface 51B is a side surface facing away from the pivot shaft X9. As shown in FIG. 5, when the cover 9 is at the closed position, the first contact surface 51B faces frontward and is in contact with the first protrusion 51A in the front-rear direction.

As shown in FIGS. 4 and 5, the second stopper 52 is located opposite to the center of gravity G1 relative to the base member 11 of the first hinge 10 in the right-left direction. In other words, the base member 11 of the first hinge 10 is located between the center of gravity G1 and the second stopper 52 in the right-left direction. The second stopper 52 is located further to the left than the first stopper 51. The second stopper 52 includes a second protrusion 52A and a second contact surface 52B.

The second protrusion 52A is formed at the upper cover 89A of the scanner housing 89 of the reading unit 8. The second protrusion 52A is a relatively small piece shaped like a block and protruding rearward toward the pivot axis X9 from an upper end of the front wall 88A of the step 88.

The second contact surface 52B is formed at the pivot member 15 of the first hinge 10. The second contact surface 52B is a side surface facing away from the pivot shaft X9. As shown in FIG. 5, when the cover 9 is at the closed position, the second contact surface 52B faces frontward and is in contact with the second protrusion 52A in the front-rear direction.

As shown in FIGS. 4 and 5, the third stopper 53 and the center of gravity G1 are located on a same side of the first hinge 10 in the right-left direction. The third stopper 53 is located further to the left than the second hinge 20 and the center of gravity G1. The third stopper 53 includes a first engaging portion 53A and a second engaging portion 53B.

The first engaging portion 53A is formed at the upper cover 89A of the scanner housing 89 of the reading unit 8. The first engaging portion 53A is a recess with a bottom and is recessed downward from a rear-left corner portion of an upper surface of the upper cover 89A of the scanner housing 89.

The second engaging portion 53B is a cylindrical protrusion formed adjacent to the pivot axis X9 of the bottom wall 9D of the cover 9. As shown in FIG. 5, when the cover 9 is at the closed position, the second engaging portion 53B protrudes downward to engage the first engaging portion 53A. In this state, a peripheral surface of the second engaging portion 53B is in contact with an inner wall surface of the first engaging portion 53A in the front-rear direction and in the right-left direction.

Image Reading

In order to read an image of a document supported on the support surface 81A in the image reading apparatus 1, the scanning mechanism (not shown) is actuated to move the reading sensor 3S in the right-left direction between a reading start position defined below a left edge of the support surface 81A and a reading end position defined below a right edge of the support surface 81A. In this way, the image sensor 3S reads the image of the document supported on the support surface 81A. After the reading sensor ends image reading, the scanning mechanism (not shown) returns the reading sensor 3S to a standby position.

In order to read an image of a sheet conveyed by the conveying unit 4 from the feed tray 91 in the image reading apparatus 1, the scanning mechanism (not shown) is actuated to move the reading sensor 3S to a stationary reading position defined below the reading surface 82A. When the conveying unit 4 conveys sheets from the feed tray 91 one by one along the conveying path P1, the reading sensor 3S reads an image of each sheet passing over the reading sensor 3S. Then the conveying unit 4 discharges onto the discharge tray 92 each sheet having undergone image reading.

Effects

As shown in FIG. 6, in the image reading apparatus 1 according to the illustrative embodiment, a force F1 is applied to the center 95C of the handle 95 when a user holds the handle 95 and pivots the cover 9 from the closed position shown in at least FIG. 1 to the open position shown in at least FIG. 3.

In the image reading apparatus 1, the urging member 19 is disposed at the first hinge 10, out of the first, second, and third hinges 10, 20, 30. The first hinge 10 is spaced, by the distance LG1, to the right from the center of gravity G1 which is closer to the left end of the cover 9 than to the right end of the cover 9. The distance LG2 between the second hinge 20 and the center of gravity G1 is less than the distance LG1. The third hinge 30 is located further to the right than the first hinge 10 and is farthest from the center of gravity G1 among the first, second, and third hinges. When a user holds the handle 95 to open and close the cover 9, a frictional resistance R1 is likely to be exerted downward between the base member 11 of the first hinge 10 with the urging member 19, and the accommodating portion 71 of the scanner housing 89. As compared with the first hinge 10, a frictional resistance is less likely to be exerted between the base member 21 of the second hinge 20 without an urging member, and the accommodating portion 72 of the scanner housing 89. Also, as compared with the first hinge 10, a frictional resistance is less likely to be exerted between the base member 31 of the third hinge 30 without an urging member, and the accommodating portion 73 of the scanner housing 89.

In the image reading apparatus 1, when the force F1 is applied to the center 95C of the handle, the frictional resistance R1 is exerted at a position spaced to the right by the distance LG1 from the center of gravity G1. Thus, the second hinge 20, which is closer to the center of gravity G1, is unlikely to float from the accommodating portion 72 of the scanner housing 89. The base member 11 of the first hinge 10 is unlikely to float from the accommodating portion 71 of the scanner housing 89 due to the frictional resistance RE The base member 31 of the third hinge 30 is unlikely to float from the accommodation portion 73 of the scanner housing 89.

Consequently, the base members 11, 21, 31 of the respective first, second, and third hinges 10, 20, 30 are unlikely to shift in the top-bottom direction from each other. This allows the pivot members 15, 25, and 35 to smoothly pivot relative to the base members 11, 21, 31 and may reduce rattling of the cover 9 moving from the closed position to the open position.

Figure 7:
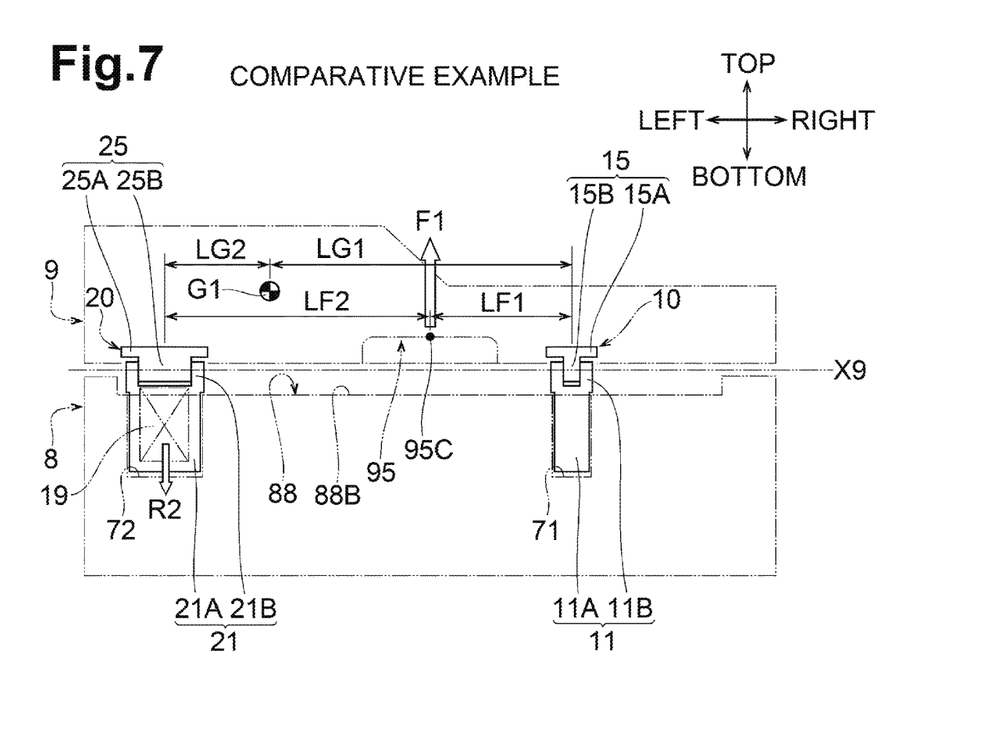
FIG. 7 is a schematic front view of an image reading apparatus as a comparative example, illustrating the relative positional relation among a reading unit, a cover, and first and second hinges.
Figure 8:
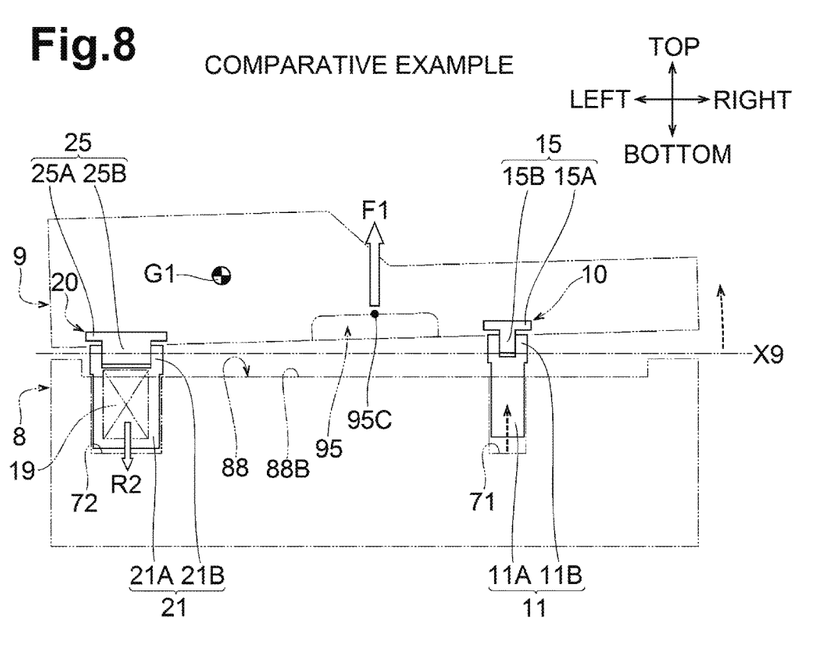
FIG. 8 is a schematic front view of the image reading apparatus as a comparative example, illustrating the relative positional relation among the reading unit, the cover, and the first and second hinges.

FIGS. 7 and 8 show a comparative example of an image reading apparatus which has a configuration partially modified from that of the image reading apparatus 1 in the illustrative embodiment. Specifically, in the comparative example, a first hinge 10, which is spaced by a distance LG1 to the right from a center of gravity G1, does not include an urging member 19, and instead a second hinge 20, which is spaced from the center of gravity G1 by a distance LG2 less than the distance LG1, includes an urging member 19. Differently from the illustrative embodiment where the third hinge 30 is provided, the comparative example does not include a third hinge. The remaining configuration of the image reading apparatus as the comparative example is the same as the configuration of the image reading apparatus 1 in the illustrative embodiment. Thus, like reference characters are used in FIGS. 7 and 8 to indicate similar elements and a repetitive description is omitted.

As shown in FIG. 7, when a user holds a handle 95 to open and close a cover 9 of the image reading apparatus as the comparative example, a frictional resistance R2 is likely to be exerted downward between a base member 21 of the second hinge 20 with the urging member 19, and an accommodating portion 72 of a scanner housing 89. In contrast, as compared with the second hinge 20, a frictional force is less likely to be exerted between a base member of the first hinge 10 without an urging member, and an accommodating portion 71 of the scanner housing 89.

In the image reading apparatus as the comparative example, when a force F1 is applied to a center 95C of a handle 9, the frictional resistance R2 is applied to the second hinge 20 which is closer to the center of gravity G1. Thus, as shown in FIG. 8, the base member 11 of the first hinge 10 is likely to float from the accommodation portion 71 of the scanner housing 89. On the other hand, the base member 21 of the second hinge 20 is unlikely to float from the accommodation portion 72 of the scanner housing 89 due to the frictional resistance R2.

This may cause the base member 11 of the first hinge 10 and the base member 21 of the second hinge 20 to shift from each other in the top-bottom direction and prevent pivot members 15, 25 from pivoting smoothly relative to the base members 11, 21. Consequently, when the cover 9 is moved from a closed position to an open position in the image reading apparatus in the comparative example, the cover 9 may rattle, resulting in poor operability in opening and closing the cover 9.

In contrast, the image reading apparatus 1 according to the illustrative embodiment may provide good operability in opening and closing the cover 9.

As shown in FIG. 6, in the image reading apparatus 1, the first hinge 10 is disposed opposite to the gravity position G1 relative to the center 95C of the handle 95 in the right-left direction. The second hinge 20 and the center of gravity G1 are on a same side relative to the center 95C of the handle 95 in the right-left direction. Especially, in the illustrative embodiment, the distance LF2 between the second hinge 20 and the center 95C of the handle 95 is greater than the distance LF1 between the first hinge 10 and the center 95C of the handle 95.

With this configuration, when the force F1 is applied to the center 95C of the handle 95, the frictional resistance R1 is exerted at a position spaced further to the right from the center of gravity G1. Thus, the base members 11, 21, 31 of the first, second, and third hinges 10, 20, 30 are unlikely to float respectively from the accommodating portions 71, 72, 73 of the scanner housing 89. Consequently, the base members 11, 21, 31 of the respective first, second, and third hinges 10, 20, 30 are unlikely to shift from each other in the top-bottom direction. This allows the pivot members 15, 25, and 35 to smoothly pivot relative to the base members 11, 21, 31 and may reduce rattling of the cover 9 when the cover 9 is moved from the closed position to the open position.

As shown in FIGS. 3 to 6, in the image reading apparatus 1, the third hinge 30 is disposed opposite to the center of gravity G1 relative to the first hinge 10. The third hinge 30, as well as the second hinge 20, does not include an urging member. In other words, the first, second, and third hinges 10, 20, 30 connect the cover 9 to the scanner housing 89 of the reading unit 8 at three positions which are spaced from each other in the right-left direction. Out of the first, second, and third hinges 10, 20, 30, the first hinge 10, which is located between the second hinge 20 and the third hinge 30, includes the urging member 19. In the image reading apparatus, this configuration helps the cover 9 smoothly pivot relative to the reading unit 8 and further improves operability in opening and closing the cover 9.

Further, as shown in at least FIG. 5, in a case or the like where a user opens and closes the cover 7 in the image reading apparatus 1, the first, second, and third stoppers 51, 52, 53, which are disposed between the reading unit 8 and the cover 9, stop the cover 9 located at the closed position from rotating along the support surface 81A, about the base member 11 of the first hinge 10.

More specifically, the first protrusion 51A and the first contact surface 51B of the first stopper 51 contact each other in the front-rear direction to thereby stop the cover 9 from rotating in the arrow direction Y1 shown in FIG. 5. The second protrusion 52A and the second contact surface 52B of the second stopper 52 contact each other in the front-rear direction to thereby also stop the rotation of the cover 9. The first engaging portion 53A and the second engaging portion 53B of the third stopper 53 engages each other to thereby also stop the rotation of the cover 9. When any one of the first, second, and third stoppers 51, 52, 53 becomes worn, the remaining stoppers may compensate the worn stopper and stop the rotation of the cover 9 properly for a long period of time.

Consequently, the cover 9 located at the closed position is restricted from shifting out of position relative to the reading unit 8. Thus, the relative positional relation may be accurately maintained between the reading sensor 3S of the reading unit 8 and a sheet conveyed by the conveying unit 4.

While the disclosure has been described in detail with reference to the specific embodiment, this is merely an example, and various changes, arrangements and modifications may be applied therein without departing from the spirit and scope of the disclosure.

Although, in the illustrative embodiment, the first engaging portion 53A of the reading unit 8 is recessed downward, and the second engaging portion 53B of the cover 9, when at the closed position, protrudes downward to engage the first engaging portion 53. However, in other embodiments, a first engaging portion of the reading unit 8 may protrude upward, and a second engaging portion of the cover 9, when at the closed position, may be recessed upward.

In place of the first, second, third stoppers 51, 52, 53 in the above-described illustrative embodiment, at least one stopper may be disposed between the reading unit 8 and the cover 9. Alternatively, at least two stoppers may be disposed there. In this case, when one of the stoppers becomes worn, the other may compensate the worn stopper.

The third hinge 30 in the image reading apparatus 1 in the above-described embodiment may be omitted in other embodiments. This case may also improve operability in opening and closing the cover 9.

In the above-described embodiment, the handle 95 is disposed at exactly or substantially a center of the image reading apparatus 1 in the first direction (e.g. in the right-left direction), and the force F1 is applied, when a user moves the cover 9 to the open positon, to the center 95C of the handle 95 in the first direction. The position to which the force F1 is applied is defined with reference to the handle 95. However, it is expected that a user stands in front of the image reading apparatus 1 and holds exactly or substantially a center of the cover 9 in the first direction of the cover 9 to open the cover 9. Therefore, with reference to exactly or substantially the center of the cover 9 in the first direction, the distance LG1 between the first hinge 10 and the center of gravity G1, and the distance LG2 between the second hinge 20 and the center of gravity G1 may be set, and the first hinge 10 and the second hinge 20 may be disposed based on such distances LG1 and LG2.

What is claimed is:

1. An image reading apparatus comprising:
   a reading unit including:
      a support surface configured to support a document thereon; and
      a reading sensor configured to read an image of the document supported on the support surface;
   a cover including a conveying unit, the conveying unit being disposed above the reading unit and configured to convey a document to the reading sensor, the cover being pivotable about a pivot axis between a closed position and an open position relative to the support surface, the pivot axis extending in a first direction, and the cover including a first end and a second end in the first direction, the second end being opposite to the first end in the first direction;
   a hinge mechanism connecting the cover to the reading unit pivotably about the pivot axis, the hinge mechanism including a first hinge which includes:
      a base member movably disposed in the reading unit, the base member being movable in a second direction orthogonal to the support surface; and
      a pivot member supported by the base member pivotably about the pivot axis and coupled to the cover,
   wherein the conveying unit and a center of gravity of the cover are both closer to the first end of the cover in the first direction than to the second end of the cover,
   wherein the first hinge is spaced from the center of gravity toward the second end of the cover in the first direction, and the hinge mechanism further includes a second hinge disposed closer to the center of gravity in the first direction than the first hinge, and
   wherein the first hinge further includes an urging member configured to exert an urging force between the base member and the pivot member so as to maintain the cover at a pivoted positon between the closed position and the open position.

2. The image reading apparatus according to claim 1,
   wherein the cover further includes, in a third direction, a third end and a fourth end, the third direction being orthogonal to the first direction and the second direction, the third end being farther from the pivot axis than the fourth end, and the cover including a handle disposed at the third end,
   wherein the first hinge is disposed between, in the first direction, a center of the handle and the second end of the cover, and
   wherein the center of gravity of the cover and the second hinge are both disposed between, in the first direction, the center of the handle and the first end of the cover.

3. The image reading apparatus according to claim 1, wherein the hinge mechanism further includes a third hinge, and
   wherein the first hinge is disposed between the center of gravity of the cover and the third hinge in the first direction.

4. The image reading apparatus according to claim 1, further comprising a stopper unit disposed between the reading unit and the cover and configured to stop the cover, located at the closed position, from rotating along the support surface.

5. The image reading apparatus according to claim 4, wherein the stopper unit includes a stopper, the first hinge being disposed between the stopper and the center of gravity in the first direction.

6. The image reading apparatus according to claim 5, wherein the stopper includes:
   a protrusion disposed at the reading unit and protruding in a third direction toward the pivot axis, the third direction being orthogonal to the first direction and the second direction, and
   a contact surface disposed at the cover at a position adjacent to the pivot axis, the contact surface being configured to, when the cover is at the closed position, contact the protrusion in the third direction.

7. The image reading apparatus according to claim 4, wherein the stopper unit includes a stopper, the base member of the first hinge being disposed between the center of gravity of the cover and the stopper in the first direction, the stopper including:

a protrusion disposed at the reading unit and protruding in a third direction toward the pivot axis, the third direction being orthogonal to the first direction and the second direction, and a contact surface disposed at the pivot member of the first hinge and configured to, when the cover is at the closed position, contact the protrusion of the stopper in the third direction.

8. The image reading apparatus according to claim 4, wherein the stopper unit includes a stopper, the center of gravity of the cover being located between the stopper and the first hinge in the first direction, the stopper including:

a first engaging portion disposed at the reading unit; and a second engaging portion disposed at the cover and configured to, when the cover is at the closed position, engage the first engaging portion, wherein when the cover is at the closed position, one of the first engaging portion and the second engaging portion protrudes in the second direction, and the other of the first engaging portion and the second engaging portion is recessed in the second direction.

* * * * *